United States Patent
Han et al.

(10) Patent No.: US 6,757,473 B2
(45) Date of Patent: Jun. 29, 2004

(54) OPTICAL FIBER AND PLANAR WAVEGUIDE FOR ACHIEVING A SUBSTANTIALLY UNIFORM OPTICAL ATTENUATION

(75) Inventors: Won-Taek Han, Gwangju Metropolitan (KR); Jin-Haing Kim, Yosu-shi (KR)

(73) Assignees: Optonest Corporation (KR); K-JIST (KR)

(*) Notice: Subject to any disclaimer, the term of this patent is extended or adjusted under 35 U.S.C. 154(b) by 36 days.

(21) Appl. No.: 10/060,270

(22) Filed: Jan. 30, 2002

(65) Prior Publication Data

US 2002/0106181 A1 Aug. 8, 2002

(30) Foreign Application Priority Data

Feb. 2, 2001 (KR) .......................................... 2001-5024

(51) Int. Cl.[7] .............................. G02B 6/00; G02B 6/134
(52) U.S. Cl. ....................................... 385/142; 385/140
(58) Field of Search ................................. 385/123, 129, 385/140–145

(56) References Cited

U.S. PATENT DOCUMENTS

| 5,274,734 A | * | 12/1993 | Jin et al. |
| 5,841,926 A | * | 11/1998 | Takeuchi et al. ............ 385/123 |
| 6,498,888 B1 | * | 12/2002 | Chenard et al. ............ 385/127 |

* cited by examiner

*Primary Examiner*—Hemang Sanghavi
*Assistant Examiner*—Omar Rojas
(74) *Attorney, Agent, or Firm*—Harness, Dickey & Pierce, P.L.C.

(57) ABSTRACT

The present invention relates to an optical fiber and a planar waveguide for achieving a uniform optical attenuation, which comprises a core co-doped with a first metal ions having an optical absorption coefficient of a negative slope in a particular wavelength band and a second metal ions having an optical absorption coefficient of a positive slope in a predetermined wavelength band.

6 Claims, 21 Drawing Sheets

OPTICAL FIBER AND PLANAR WAVEGUIDE FOR ACHIEVING A SUBSTANTIALLY UNIFORM OPTICAL ATTENUATION

BACKGROUND OF THE INVENTION

1. Field of the Invention

The present invention relates to an optical fiber and a planar waveguide for attenuating received optical signals in an optical communications system.

2. Description of the Related Art

The need for tremendous amount of data to be transmitted in optical communications led the development of Wavelength Division Multiplexing(WDM) in addition to Time Division Multiplexing(TDM). WDM is to transmit a plurality of optical signals having different wavelength through a single transmission line, thus increasing the transmission efficiency of signal.

In the optical communications system, since the signal loss increases with the length of the optical fiber, the distant receiving end receives signals so weakened as to make it difficult to effectively detect them.

In order to resolve the problem of such signal loss, an amplifying means for amplifying the optical signal is disposed between the transmitter and the receiver, and the transmitter fortifies the output signal in order to compensate for such signal loss. However, if a receiving apparatus such as optical fiber amplifier is installed near the transmitter generating signals of high level output, it cannot properly detect such signals. Accordingly, there have been proposed methods of attenuating the optical signal received at the front end of the receiving apparatus. These are to offset the ferules to each other, to cause some amount of light to leak through gaps between the ferules, to make the cores of the optical fiber to have different diameters, or to insert filters between the ferules.

However, the filter-type optical attenuator has the attenuation region too small to precisely control the absorption rate.

SUMMARY OF THE INVENTION

It is an object of the present invention to provide an optical attenuator comprising an optical fiber with a core doped with dopants for absorbing light in a particular wavelength band.

It is another object of the present invention to provide an optical fiber for uniformly attenuating an optical signal in a particular wavelength band.

It is still another object of the present invention to provide a planar waveguide for uniformly attenuating an optical signal in a particular wavelength band.

According to an aspect of the present invention, an optical fiber for achieving a substantially uniform optical attenuation comprises a core layer and a cladding layer, wherein the core layer is co-doped with ions of at least one or more of first metals having optical absorption coefficients of negative slope in a particular wavelength band and ions of at least one or more of second metals having an optical absorption coefficients of positive slope in the particular wavelength band.

Preferably, the first metals are Fe, Cr, Mn and V, and the second metals are Co and Ni.

According to another aspect of the present invention, an optical fiber having a core layer and a cladding layer for achieving a substantially uniform optical attenuation comprises a first optical fiber with a core layer doped with ions of first metals having optical absorption coefficients of negative slope in a particular wavelength band; and a second optical fiber with a core layer doped with ions of second metals having an optical absorption coefficients of positive slope in the particular wavelength band, wherein the second fiber is connected with the first optical fiber in series.

According to other aspect of present invention, a planar waveguide for achieving a substantially uniform optical attenuation comprises a core and a cladding layer, wherein the core is co-doped with ions of at least one or more of first metals having optical absorption coefficients of negative slope in a particular wavelength band and ions of at least one or more of second metals having an optical absorption coefficients of positive slope in the particular wavelength band.

Preferably, the first metals are Fe, Cr. Mn and V, and the second metals are Co and Ni.

The above objects and other features of the present invention will be more apparent from the following description taken in conjunction with the accompanying drawings.

DESCRIPTION OF THE PREFERRED EMBODIMENTS

Figure 1:
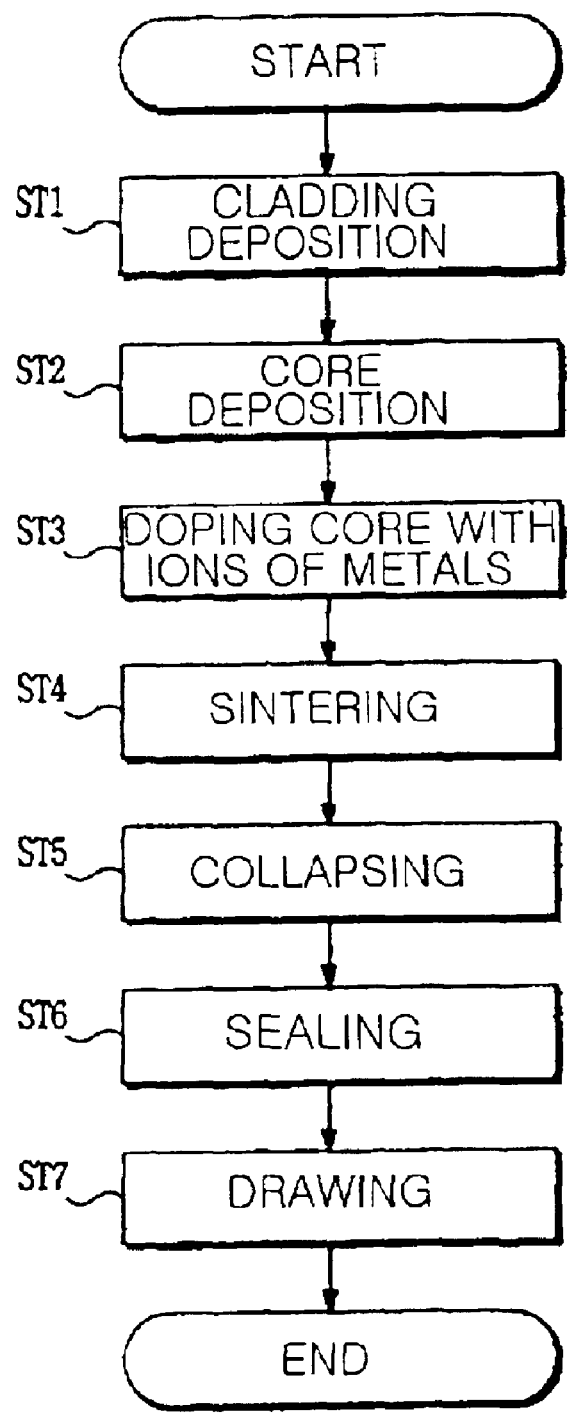
FIG. 1 is a flow chart for showing a process of fabricating an optical fiber for optical attenuation according to the first embodiment of the present invention.

FIG. 1 is a flow chart for illustrating a process of fabricating an optical fiber for achieving a substantially uniform optical attenuation according to a first preferred embodiment of the present invention, in which Modified Chemical Vapor Deposition (MCVD) is used.

First, a cladding layer is deposited on the inside of a tube by using $SiCl_4$, $POCl_3$ and $CF_4$ (ST1), and then a core layer by using $SiCl_4$ and $GeCl_4$ (ST2)

Thereafter, the core layer is partially sintered and doped with particular metal ions (ST3). It is then dried, and sintered accompanying oxidation (ST4).

Then, it is collapsed and sealed to obtain an optical fiber preform (ST5, ST6), which is finally drawn to produce an optical containing the metal ions (ST7).

Hereinafter, referring to FIGS. 2A to 2D, the process of doping the core layer with the metal ions will be described.

Figure 2A:
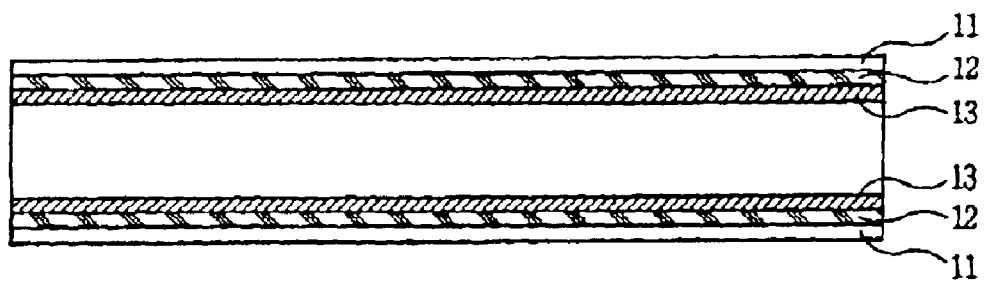
FIGS. 2A to 2D are sectional views for showing the metal ions doping process illustrated in FIG. 1.
Figure 2B:
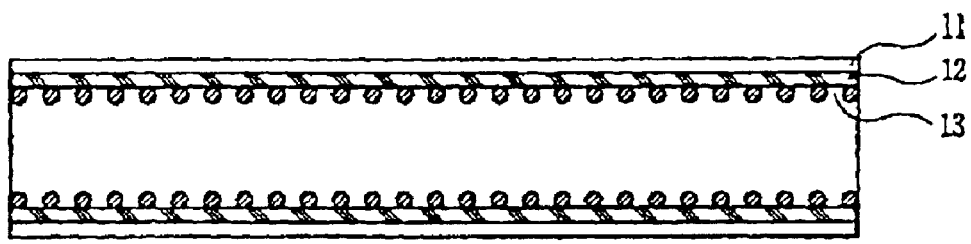

First, as shown in FIGS. 2A to 2D, a cladding layer 12 and a core layer 13 are deposited on the inside of the tube 11 (FIG. 2A), and then partially sintered to form a porous layer (FIG. 2B).

Figure 2C:
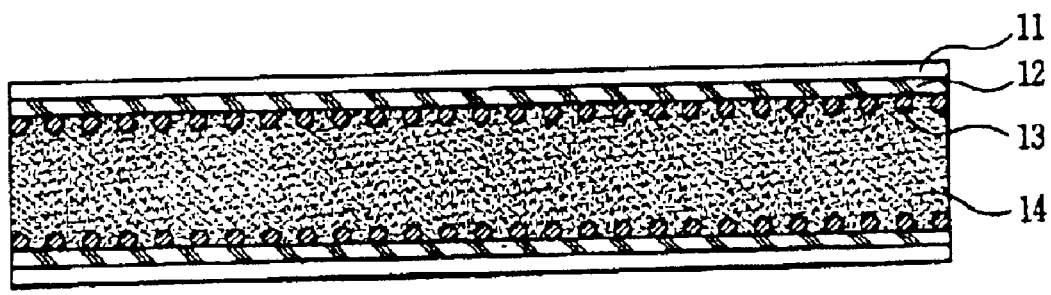

Subsequently, the porous layer is infiltrated with a solution 14 containing a predetermined amount of metal ions, and that maintained for approximately 1 hour (FIG. 2C).

Figure 2D:
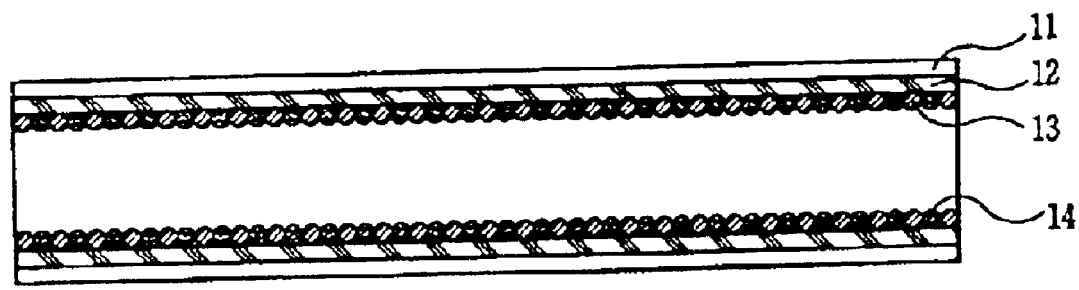

Thereafter, the solution 14 is exhausted from the tube 11. At this time, some of the metal ions dissolved in the solution 14 remain in the porous core layer. That is, the core layer 13 is doped with the metal ions (FIG. 2D).

In this case, the above metal ions dissolved in the solution 14 include at least ions of one or more of the first metal such as Fe, Cr, V and Mn, and ions of at least one or more of the second metal such as Co and Ni, and Al ions, in which the first metal has the optical absorption coefficients of negative slope in an optical signal wavelength band, and the second metal has the optical absorption coefficients of positive slope in the optical signal wavelength band. The Al serves to prevent the metal ions from vaporizing during the hot collapsing step.

In this case, the mole ratio of the first metal ion, the second metal ion and Al is 1 to 3:4 to 6:1 to 3. Since, depending on the temperature and gas pressure of the process, the final value of the mole ratio may be changed, the mole ratio must be determined within the higher and lower limit values.

Consequently, the core portion is co-doped with the first metal ions and the second metal ions, of which the optical absorption coefficients have respectively negative slope and positive slope in the optical signal wavelength band, so that the inventive optical fiber may make a substantially uniform for input optical signal.

Figure 3A:
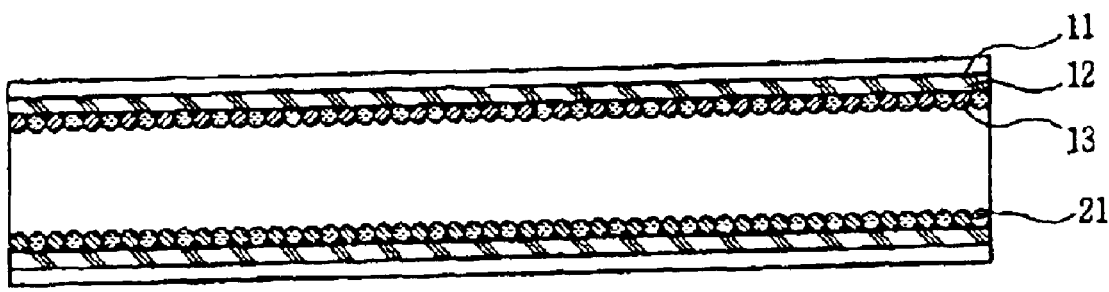
FIGS. 3A to 3C are sectional views for showing a process of fabricating an optical fiber for optical attenuation according to the second embodiment of the present invention.
Figure 3B:
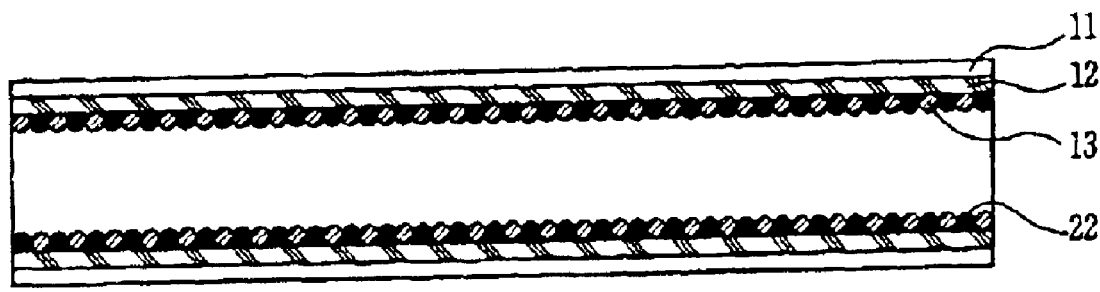
Figure 3C:
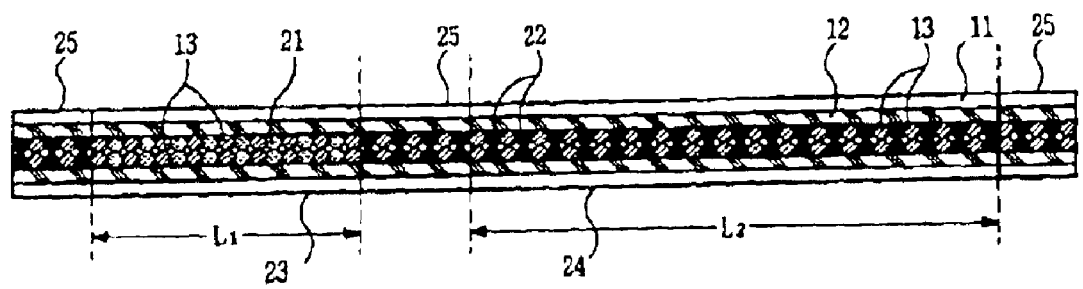

Besides, the optical fiber for making a uniform optical attenuation can also be achieved by connecting a first optical fiber doped with the first metal ions and the second optical fiber doped with the second metal ions in series. FIGS. 3A to 3C illustrate the optical fiber for making a uniform optical attenuation according to a second embodiment of the present invention.

FIG. 3A is the preform of a first optical fiber with the porous core layer 13 doped with the first metal ions 21, and FIG. 3B is the preform of a second optical fiber with the porous core layer 13 doped with the second metal ions 22. In the second embodiment, as shown in FIG. 3C, the first optical fiber 23 doped with the first metal ions 21 and the second optical fiber 24 doped with the second metal ions 22 are separately interposed between portions 25 of an ordinary optical fiber forming a transmission line.

The length ratio of the first optical fiber L1 and the second optical fiber L2 is L1:L2=1:2, in which the first optical fiber is doped with 0.125 mole of Fe ions and the second optical fiber doped with 0.3 mole of Co ions.

Of course, as previously described, the core layer is co-doped with Al, and the mole ratio of the first metal ions: the second metal ions: Al is 1 to 3:4 to 6:1 to 3.

Hereinafter, referring to FIGS. 4 to 15, the optical absorption coefficients of the first and second metal ions will be described.

FIGS. 4 to 7 illustrate the optical absorption coefficients of the first metal ions varying with wavelength.

Figure 4:
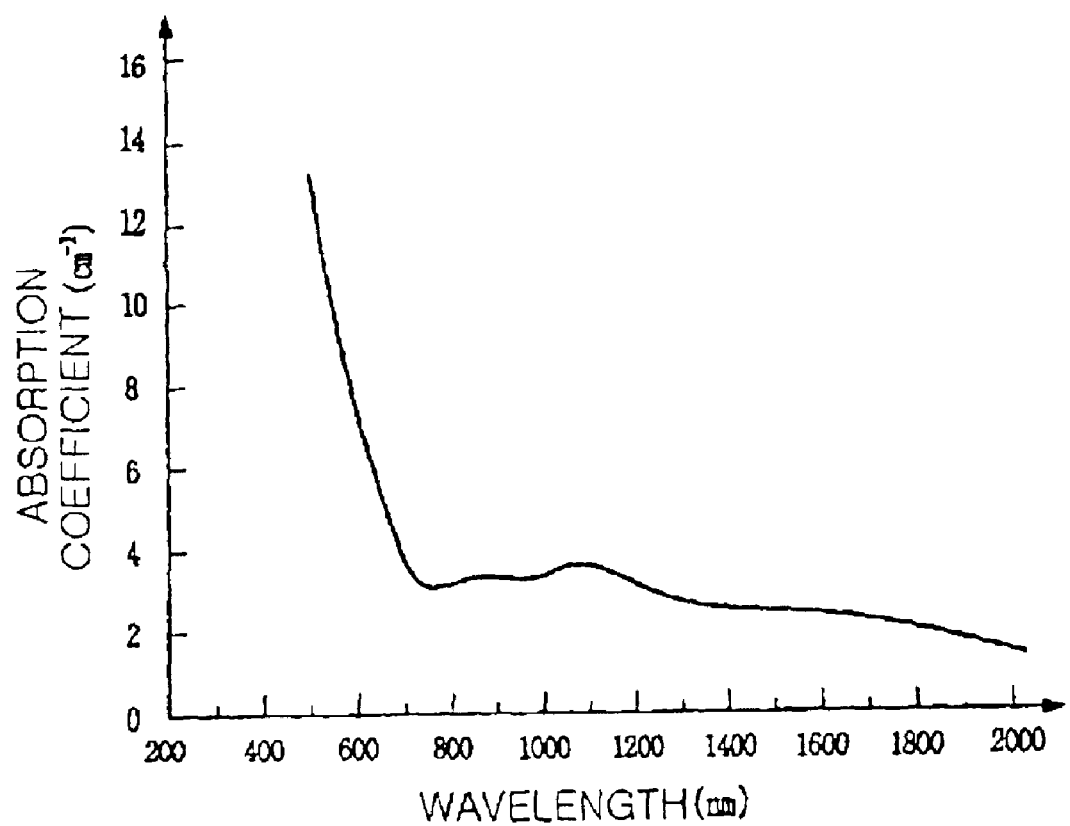
FIGS. 4 to 7 are graphs for showing the optical absorption property of the first metal ions according to wavelengths.

FIG. 4 illustrates a Fe-containing quartz glass having optical absorption coefficients varying with wavelength with negative slope in a wavelength band of about 1100 nm to 1900 nm.

Figure 5:
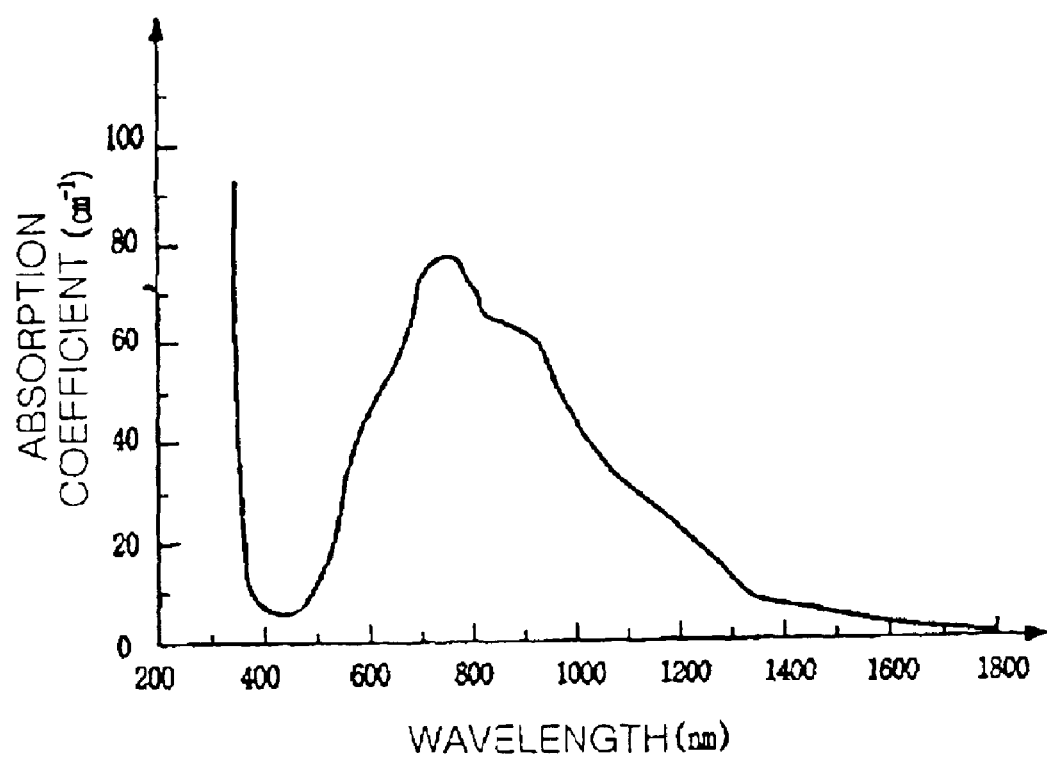

FIG. 5 illustrates a V-containing quartz glass having optical absorption coefficients varying with wavelength with negative slope in a wavelength band of about 700 nm to 1800 nm.

Figure 6:
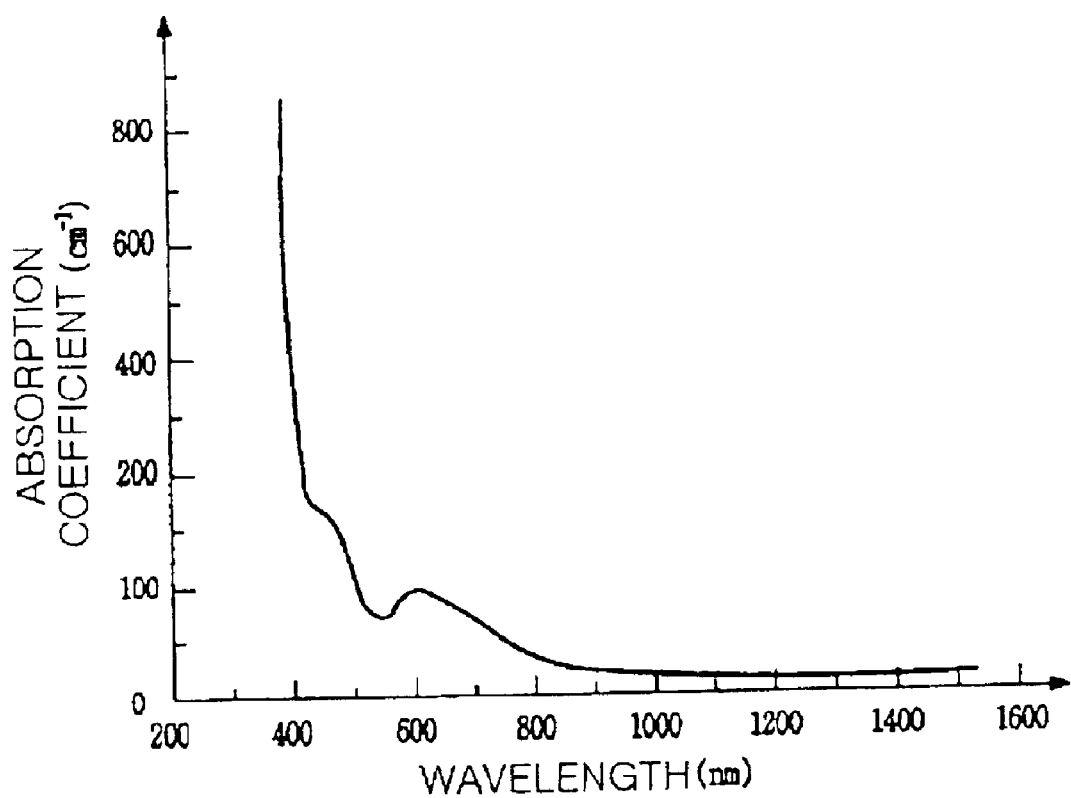

FIG. 6 illustrates a Cr-containing quartz glass having optical absorption coefficients varying with wavelength with negative slope in a wavelength band of about 600 nm to 1600 nm.

Figure 7:
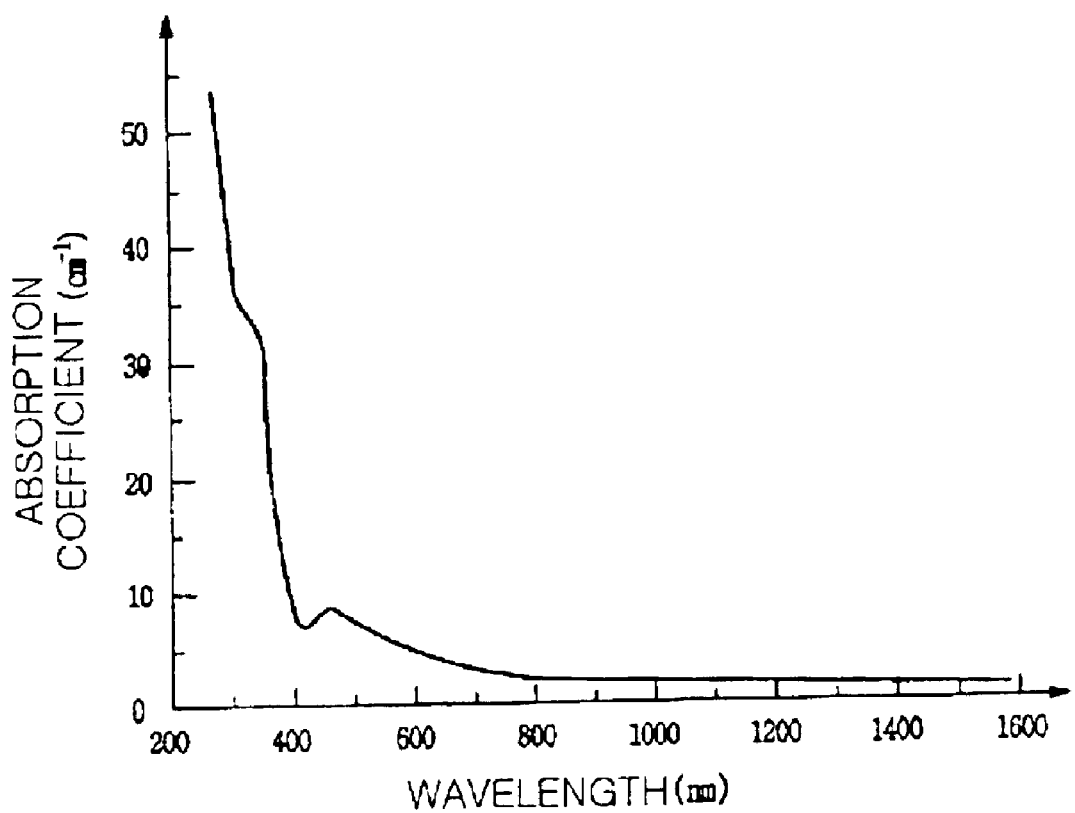

FIG. 7 illustrates a Mn-containing quartz glass having optical absorption coefficients varying with a wavelength with negative slope in a wavelength band of about 450 nm to 1600 nm.

Namely, ions of the first metal such as Fe, V, Cr and Mn, as shown in FIGS. 4 to 7, have the optical absorption coefficients of negative slope in a particular wavelength band of about 1100 nm to 1600 nm.

Figure 8:
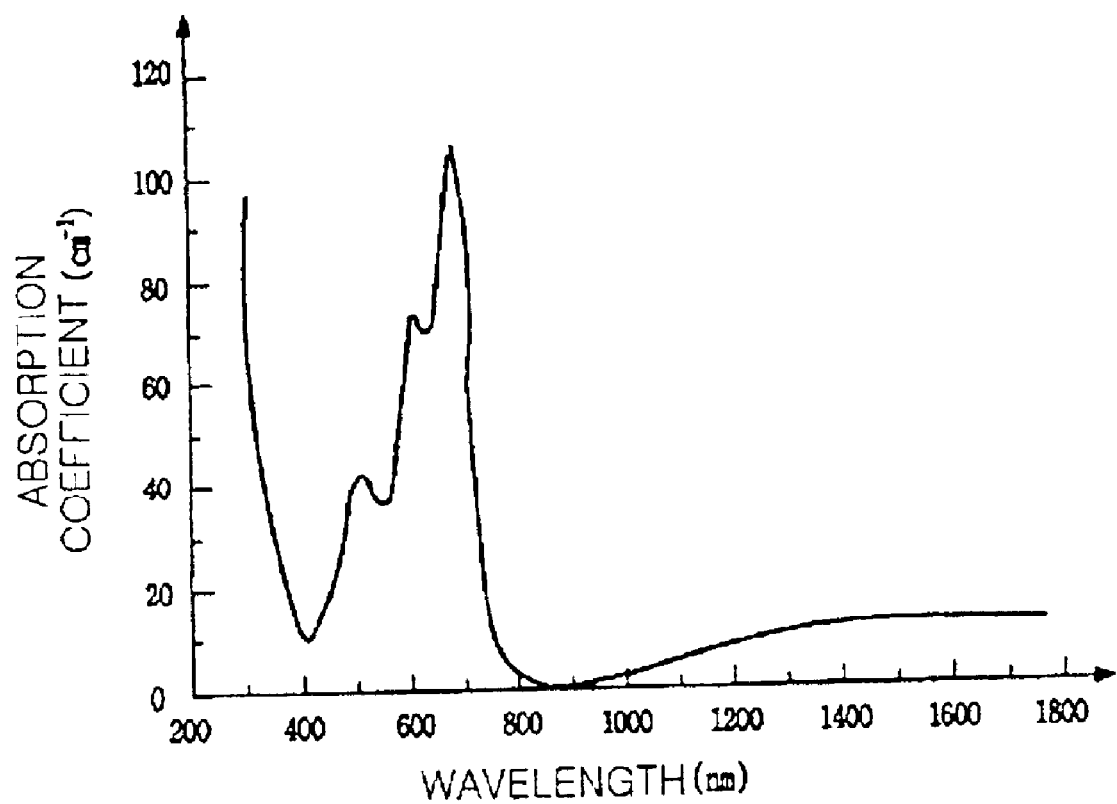
FIGS. 8 and 9 are graphs for showing the optical absorption property of the second metal ions according to wavelengths.
Figure 9:
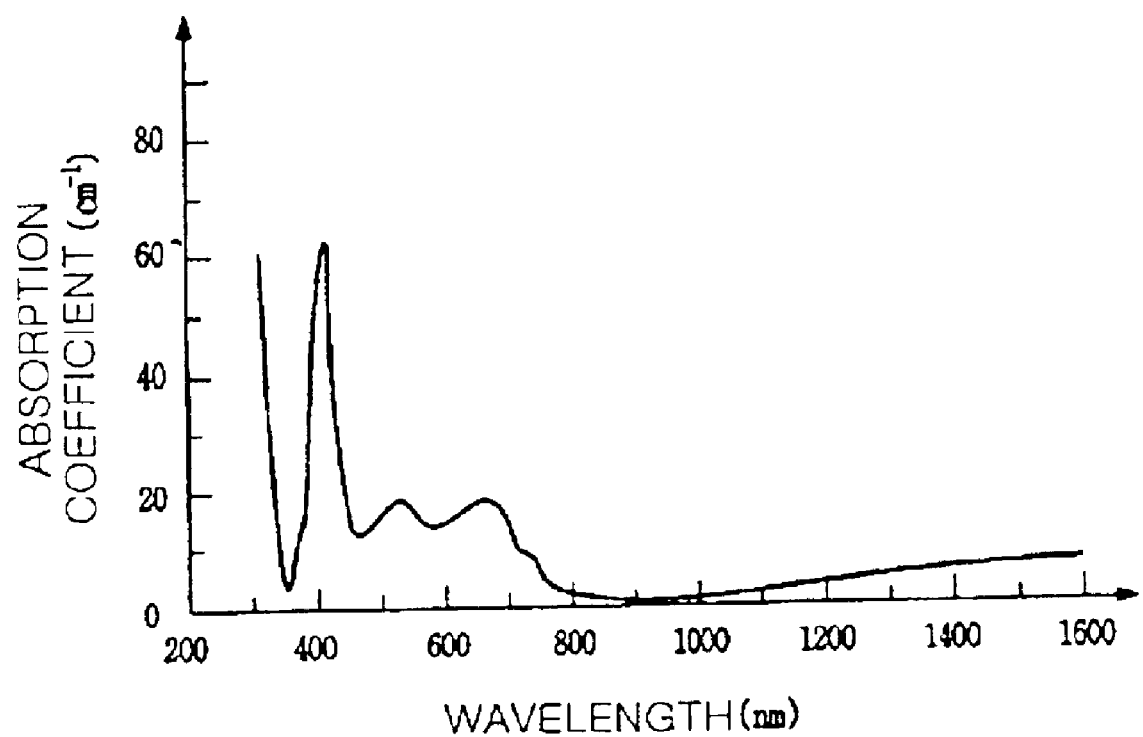

Also, the optical absorption coefficients of the second metal ions are illustrated in FIGS. 8 and 9. FIG. 8 illustrates a Co-containing quartz glass having optical absorption coefficients varying with wavelength with positive slope in a wavelength band of about 900 nm to 1800 nm.

FIG. 9 illustrates a Ni containing quartz glass having optical absorption coefficients varying with wavelength with positive slope in a wavelength band of about 1000 nm to 1600 nm.

Namely, ions of the second metal ions such as Co and Ni, as shown in FIGS. 8 and 9, have the optical absorption coefficients of positive slope in a particular wavelength band of about 1100 nm to 1600 nm.

Figure 10:
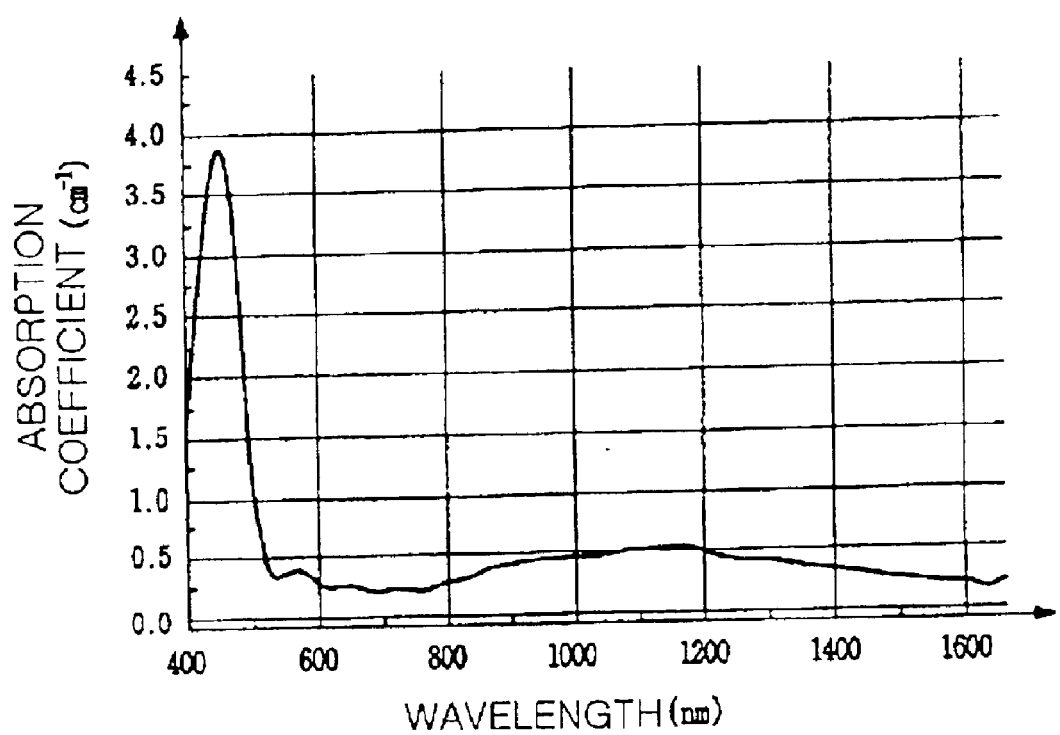
FIG. 10 is a graph for showing the optical absorption property of a Fe-doped optical fiber according to wavelengths.

Also, FIG. 10 illustrates optical absorption coefficients of an optical fiber doped with Fe ions having negative slope with wavelength in a wavelength band of about 1150 nm to 1650 nm.

Figure 11:
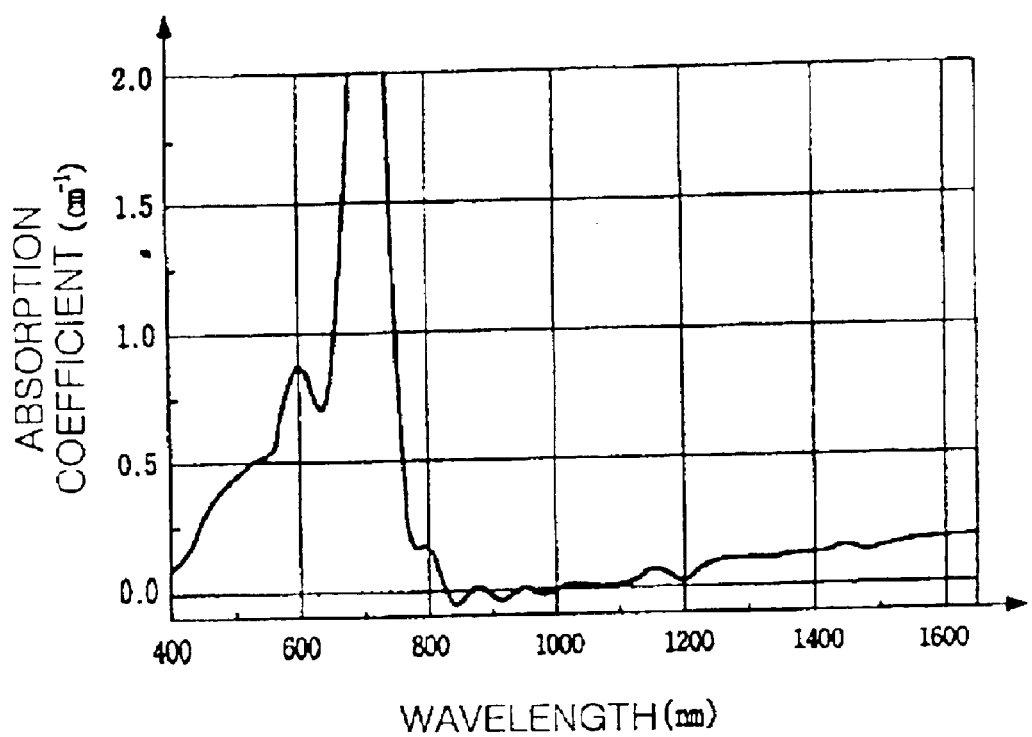
FIG. 11 is a graph for showing the optical absorption property of a Co-doped optical fiber according to wavelengths.

And, FIG. 11 illustrates optical absorption coefficients of an optical fiber doped with Co ions having positive slope with wavelength in a wavelength band of about 900 nm to 1650 nm.

Namely, making comparison between FIGS. 4 and 10, between FIGS. 8 and 11, the optical absorption coefficients have negative slope with wavelength in the optical signal transmitting band of 1200 nm to 1600 nm although showing a slight difference.

Figure 12:
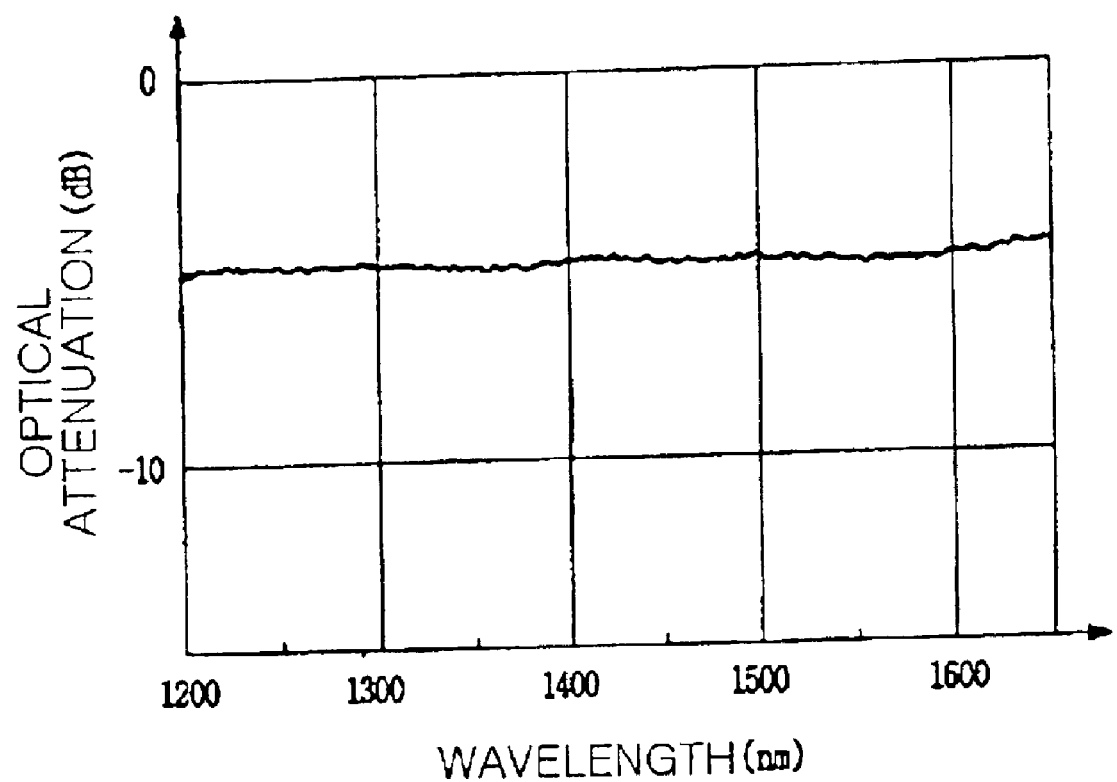
FIGS. 12 and 13 are graphs for showing the characteristics of optical attenuation of an optical fiber co-doped with Fe and Co.
Figure 13:
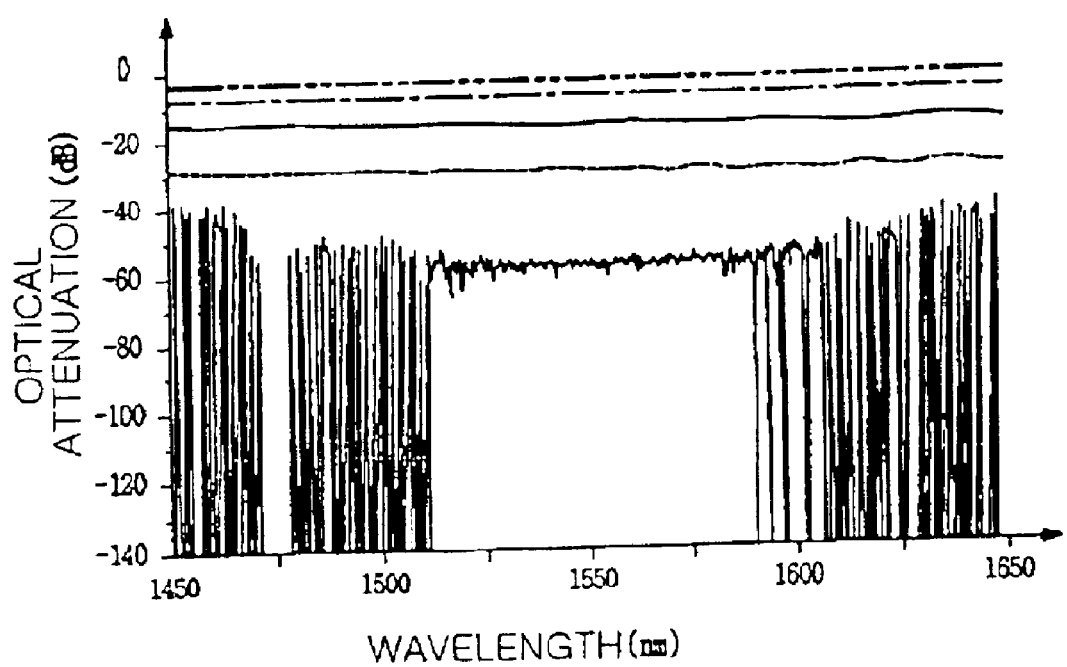

FIGS. 12 and 13 illustrate the characteristics of the optical attenuation of an optical fiber according to the first embodiment of the present invention, which is co-doped with Fe ions, Co ions and Al ions with a particular mole ratio, for example, 1:4.4:1.6.

FIG. 12 illustrates the optical attenuation characteristics of an optical fiber doped with Fe and Co using a white light source for the input light, in which the optical attenuation deviation is approximately ±0.4 dB in the wavelength band of 1200 nm to 1600 nm. In this case, the length of the optical fiber was selected to be 1 nm.

FIG. 13 illustrates the optical attenuation characteristics of an optical fiber doped with Fe and Co using a broad band light source for the input light, in which the optical attenuation deviation is approximately ±1 dB in the wavelength band of 1450 nm to 1600 nm.

Figure 14:
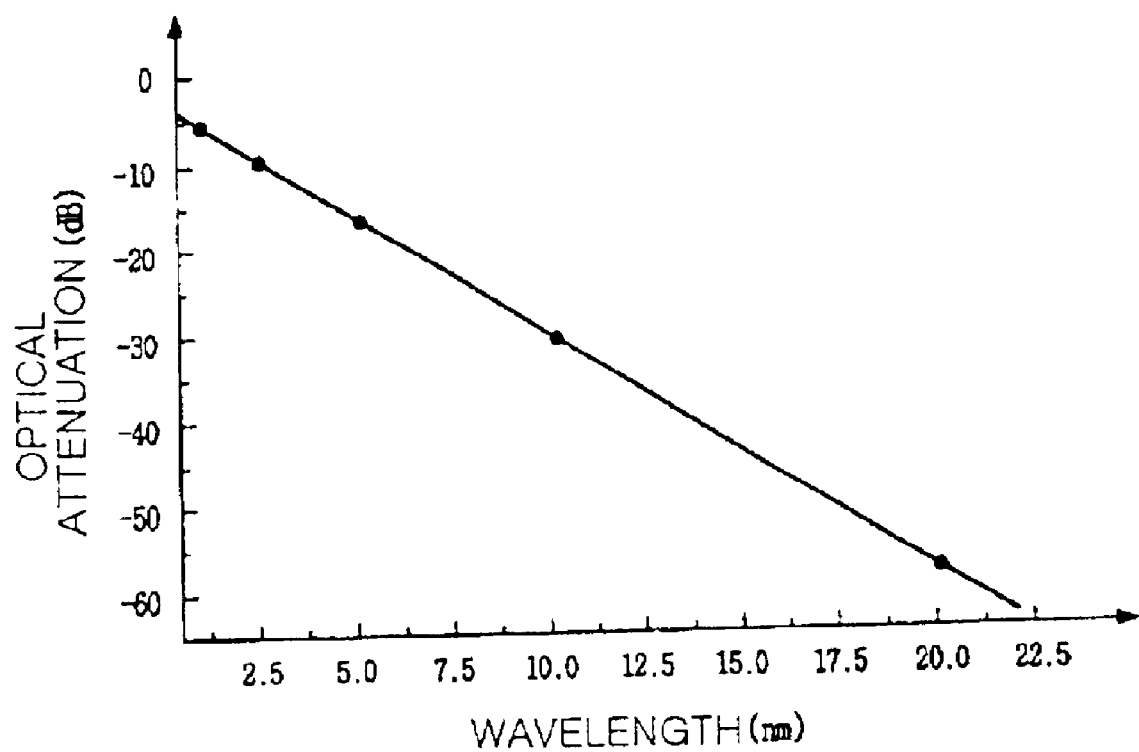
FIG. 14 is a graph for showing the characteristics of optical attenuation according to length of an optical fiber co-doped with Fe and Co.

The optical attenuation level varies with the length of the optical fiber, as illustrated in FIG. 14, which shows the characteristics of the optical attenuation varying with the length of an optical fiber co-doped with Fe ions and Co ions using the input wavelength of 1550 nm.

In this case, the attenuation rate is about 5 dB per 1 mm of the optical fiber co-doped with Fe ions and Co ions, so that the optical attenuation level increases with the length of the optical fiber.

Figure 15:
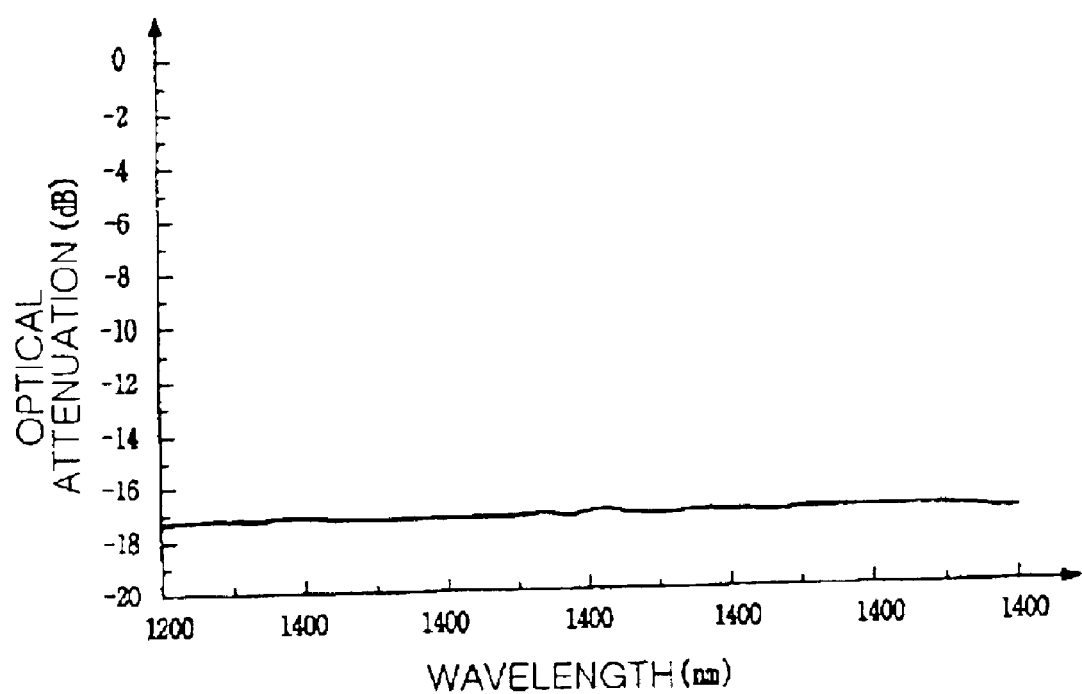
FIG. 15 is a graph for showing the characteristics of optical attenuation in the case of connecting the first optical fiber doped with Fe and the second optical fiber doped with Co in series.

Further, FIG. 15 illustrates the optical attenuation characteristics of an optical fiber according to the second embodiment of the present invention, in which 5 cm of the first optical fiber doped with Fe ions and 10 cm of the second optical fiber doped with Co ions are connected in series. In this case, the mole ratio of Fe ions:Co ions is 0.125:0.3. This shows a substantially uniform optical attenuation in the wavelength band of 1300 nm to 1600 nm.

Thus, according to the present invention, the optical fiber for uniform optical attenuation can be provided by co-doping the core layer with ions of one of the first metals having optical absorption coefficients of negative slope and ions of one of the second metals having optical absorption coefficients of positive slope in a particular optical signal wavelength band. Specifically describing the co-dopant pair may be Fe ions and Co ions, Cr ions and Co ions, Mn ions and Co ions, Fe ions and Ni ions, V ions and Ni ions, Cr ions and Ni ions, Mn ions and Ni ions, etc. It can be also provided by connecting the first optical fiber doped with ions of one of the above first metals and the second fiber doped with ions of one of the above second metals in series.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from true scope of the present invention.

For example, the core layer may be co-doped with a mixture composed of at least two or more of the first metals including Fe ions, V ions, Cr ions and Mn ions at a particular ratio, and a mixture composed of Co and Ni at a particular ratio, thus producing an optical fiber for uniform optical attenuation.

Or otherwise, the optical fiber for uniform optical attenuation can be attained by connecting the first optical fiber doped with a mixture composed of at least two or more of the above first metals at a particular ratio and the second optical fiber doped with a mixture of at least two or more of the above second metals at a particular ratio in series.

Further, an attenuator can be attained by using the optical fiber for the optical attenuation according to the above-mentioned embodiments.

Furthermore, the above-mentioned inventive concept can be equally adapted to a planar waveguide for optical attenuation. Namely, a planar waveguide for achieving a substantially uniform optical attenuation can be attained by co-doping the core with the above dopants.

Figure 16:
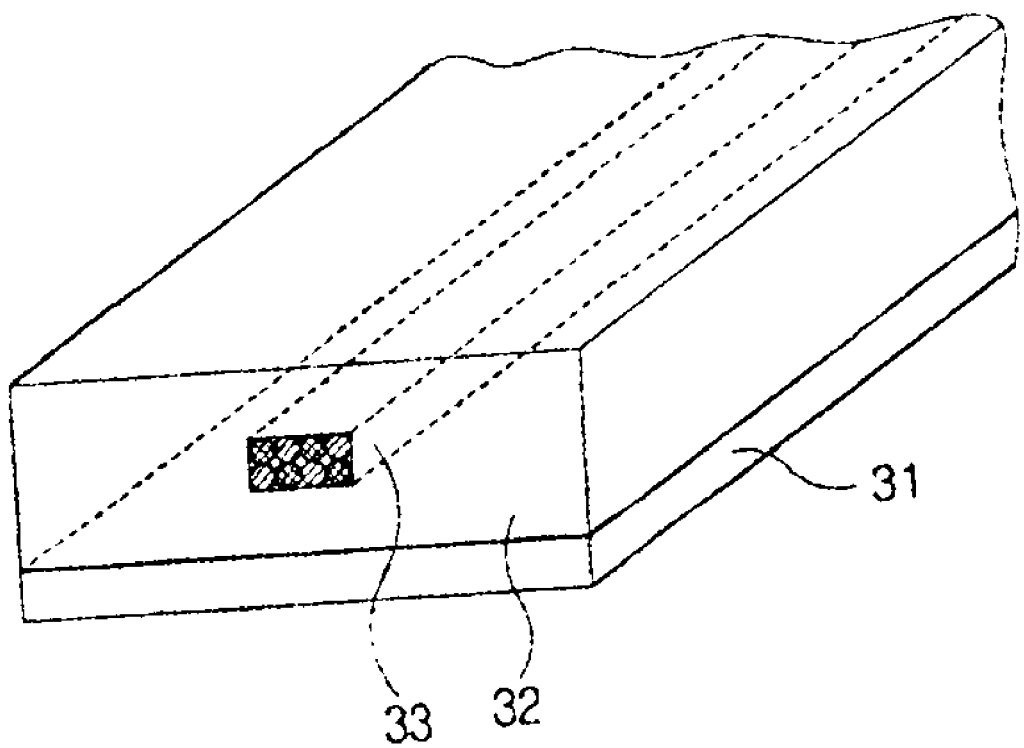
FIG. 16 illustrates a planar waveguide for optical attenuation according to the third embodiment of the present invention.

FIG. 16 illustrates a planar circuit for optical attenuation according to the third embodiment of the present invention. The inventive planar waveguide for optical attenuation has a core 33 co-doped with ions of at least one or more of the first metals and ions of at least one or both the second metals. 32 is a cladding layer and 31 is a Si substrate.

The planar waveguide for optical attenuation of the present invention may have a plurality of cores. Consequently, the inventive planar waveguide may have a plurality of waveguides that are made of the cores and a cladding layer surrounding the cores.

FIGS. 17A to 17F are sectional views for showing a process of fabricating the planar waveguide for optical attenuation according to the third embodiment of the present invention.

Figure 17A:
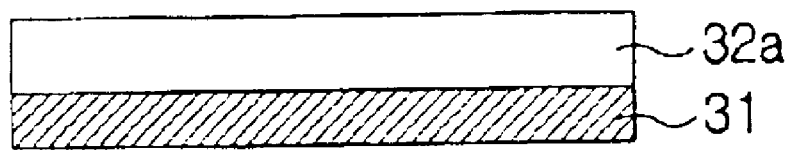
FIGS. 17A to 17F are sectional views for showing a process of fabricating the planar waveguide for optical attenuation according to the third embodiment of the present invention.

First, as shown in FIG. 17A, a buffer cladding layer 32a is formed on a Si substrate 31 by using a Flame Hydrolysis Deposition (FHD) method. The buffer cladding layer 32a may be $SiO_2$—$P_2O_5$, $SiO_2$—$B_2O_3$ or $SiO_2$—$P_2O_5$—$B_2O_3$.

Figure 17B:
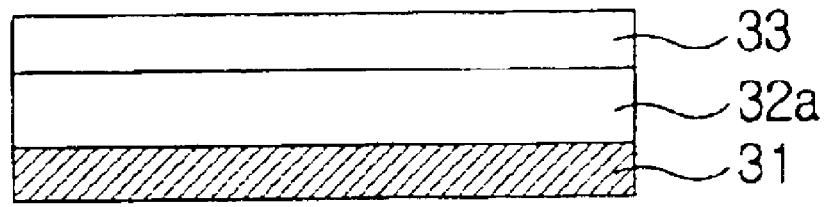

Thereafter, as shown in FIG. 17B, a core layer 33 is formed on the buffer cladding layer 32a by using the FHD method. The core layer may be $SiO_2$—$GeO_2$—$P_2O_5$, $SiO_2$—$GeO_2$—$B_2O_3$ or $SiO_2$—$GeO_2$—$P_2O_5$—$B_2O_3$.

Figure 17C:
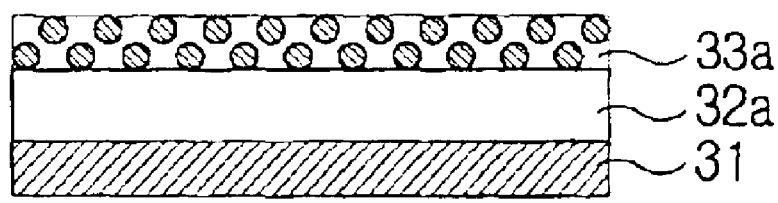

Thereafter, as shown in FIG. 17C, the core layer 33 is partially sintered to form a porous layer 33a.

Figure 17D:

Subsequently, the porous layer 33a is doped with metals ions, as shown in FIG. 17D, to form a doped porous layer 33b. The doping process comprises the steps of immersing the porous layer in a solution containing a predetermined amount of metal ions, maintaining for approximately 1 hour, and then drying the porous layer. In this case, the above metal ions dissolved in the solution include at least ions of one or more of the first metal such as Fe, Cr, V and Mn, and ions of at least one or more of the second metal such as Co and Ni, and Al ions, in which the first metal has the optical absorption coefficients of negative slope in an optical signal wavelength band and the second metal has the optical absorption coefficients of positive slope in the optical signal wavelength band. Also, the mole ratio of the first metal ion, the second metal ion and Al is 1 to 3:4 to 6:1 to 3.

Figure 17E:
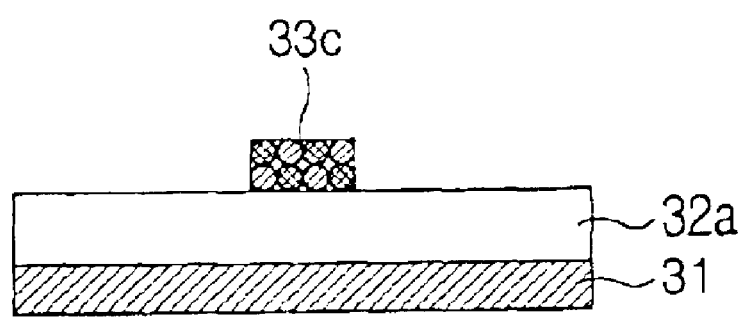

Thereafter, as shown in FIG. 17E, core 33c is formed by a photolithography and an etching process.

Figure 17F:
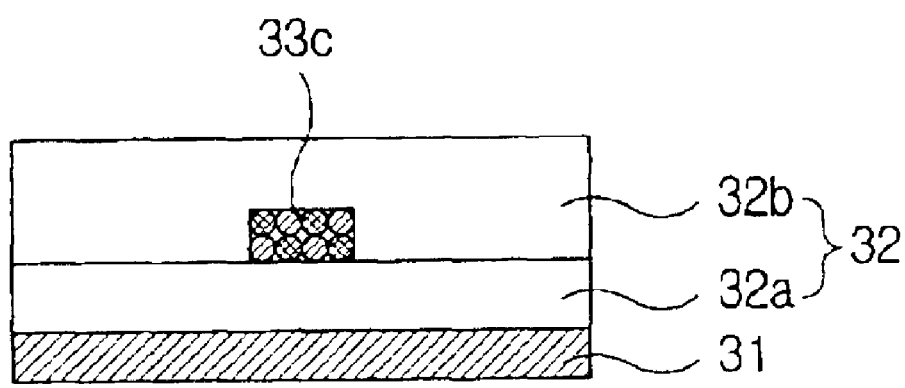

Thereafter, as shown in FIG. 17F, an over cladding layer 32b is formed over the core 33c and the buffer cladding layer 32a by the FHD method, thus forming a cladding layer 32. The over cladding layer may be $SiO_2$—$P_2O_5$ or $SiO_2$—$P_2O_5$—$B_2O_3$.

Consequently, the optical absorption coefficients of the core of the inventive planar waveguide for attenuation may have a uniform attenuation for input optical signal in the optical signal wavelength band.

As described above, according to the present invention, the optical fiber and the planar waveguide for uniform optical attenuation are provided by co-doping the core layer with ions of at least one or more of the first metals having optical absorption coefficients of negative slope in a particular optical signal wavelength band and ions of at least one or more of the second metals having optical absorption coefficients of positive slope in a particular optical signal wavelength band. Specifically, the first metals are Fe, Cr, Mn, and V, and the second metals are Ni and Co. Also, the optical fiber for uniform optical attenuation is provided by connecting the first optical fiber doped with ions of at least one or more of the above mentioned first metals and the second optical fiber doped with ions of at least one or more of the above mentioned second metals in series.

What is claimed is:

1. An optical fiber for achieving a substantially uniform optical attenuation having a core layer and a cladding layer, wherein said core layer is co-doped with ions of at least one or more of first metals having optical absorption coefficients of negative slope in particular wavelength band and ions of at least one or more of second metals having optical absorption coefficients of positive slope in said particular wavelength band.

2. The optical fiber for achieving a substantially uniform optical attenuation as defined in claim 1, wherein said first metals are Fe, Cr, Mn and V, and said second metals are Co and Ni.

3. The optical fiber for achieving a substantially uniform optical attenuation as defined in claim 1, wherein said core layer is co-doped with Al.

4. A planar waveguide for achieving a substantially uniform optical attenuation having a core and a cladding layer, wherein said core is co-doped with ions of at least one or more of first metals having optical absorption coefficients of negative slope in particular wavelength band and ions of at least one or more of second metals having optical absorption coefficients of positive slope in said particular wavelength band.

5. The planar waveguide for achieving a substantially uniform optical attenuation as defined in claim 4, wherein said first metals are Fe, Cr, Mn and V, and said second metals are Co and Ni.

6. The planar waveguide for achieving a substantially uniform optical attenuation as defined in claim 4, wherein said core is co-doped with Al.

* * * * *